United States Patent
Dawkins

(10) Patent No.: US 7,653,781 B2
(45) Date of Patent: Jan. 26, 2010

(54) AUTOMATIC RAID DISK PERFORMANCE PROFILING FOR CREATING OPTIMAL RAID SETS

(75) Inventor: William P. Dawkins, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 232 days.

(21) Appl. No.: 11/351,381

(22) Filed: Feb. 10, 2006

(65) Prior Publication Data

US 2007/0192538 A1    Aug. 16, 2007

(51) Int. Cl.
*G06F 13/00* (2006.01)

(52) U.S. Cl. .......................... 711/114; 711/170; 710/16

(58) Field of Classification Search .................. 711/114, 711/170; 710/16
See application file for complete search history.

(56) References Cited

U.S. PATENT DOCUMENTS

| | | | |
|---|---|---|---|
| 6,178,520 | B1 | 1/2001 | DeKoning et al. |
| 6,952,794 | B2 * | 10/2005 | Lu ................................ 714/7 |
| 2006/0161807 | A1 | 7/2006 | Dawkins |
| 2006/0248272 | A1 * | 11/2006 | del Rosario et al. ......... 711/114 |

OTHER PUBLICATIONS

Promise Technology, FastTrak TX4200 SATA RAID Adapter, 2004, retreived from internet Feb. 15, 2008 <url: http://www.promise.com/marketing/datasheet/file/FTTX4200_DS_021405.pdf>, pp. 1-2.*
Charles M. Kozierok, The PC Guide: Summary Comparison of RAID Levels, Apr. 17, 2001, retreived from internet Feb. 15, 2007 <url: http://www.pcguide.com/ref/hdd/perf/raid/levels/comp-c.html>, pp. 1-3.*
Charles M. Kozierok, The PC Guide: Array Expansion, Apr. 17, 2001, retreived from internet Feb. 15, 2007 <url: http://www.pcguide.com/ref/hdd/perf/raid/conf/advExpansion-c.html>, pp. 1-3.*
Freeman, Storage Basics: Choosing a RAID Controller, Enterprise Storage Forum, May 7, 2004, available at http://www.enterprisestorageforum.com/hardware/features/article.php/3351361.

* cited by examiner

*Primary Examiner*—Christian P Chace
*Assistant Examiner*—Jared I Rutz
(74) *Attorney, Agent, or Firm*—Baker Botts L.L.P.

(57) ABSTRACT

A method, information handling system, and software are disclosed for creating a RAID set from a plurality of hard disks. A performance profile for the plurality of hard disks is determined. The performance profile associated with each of the hard disks is stored at a location on the hard disk. The performance profiles on one or more of the hard disks are read. A RAID set is created. The RAID set includes a subset of the hard disks. The disks in the RAID set have similar performance profiles.

20 Claims, 6 Drawing Sheets

US 7,653,781 B2

AUTOMATIC RAID DISK PERFORMANCE PROFILING FOR CREATING OPTIMAL RAID SETS

TECHNICAL FIELD

The present disclosure relates generally to the field of data storage, and, more particularly, to a system and method for the implementation of automatic RAID disk performance profiling for creating optimal RAID sets.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system may include a storage system or storage network that includes fault tolerant data storage. One example of a fault tolerant data storage system is a RAID (Redundant Array of Independent Disks) storage system. RAID storage systems combine multiple disks into an array of disk drives to obtain performance, capacity, and reliability advantages over other storage techniques, including, for example, a single large drive. Different disks in the RAID storage system may have different characteristics, such as storage capacity, read speed, and write speed. The RAID controller may be able to determine the characteristics of the drives based on available specifications or user input. Specifications for other drives, however, may not be available to the RAID controller. This lack of drive characteristics may make designating a set of drives for a RAID storage system for a specific application difficult. Certain applications that use a set a drives in a RAID storage system may benefit from having a group of drives with similar characteristics.

SUMMARY

In accordance with the present disclosure, a method, information handling system, and software are disclosed for creating a RAID set from a plurality of hard disks. A performance profile for the plurality of hard disks is determined. The performance profile associated with each of the hard disks is stored at a location on the hard disk. The performance profiles on one or more of the hard disks are read. Based on the performance profiles read, a RAID set is created from a subset of the hard disks. The disks in the RAID set have similar performance profiles.

The system and method disclosed herein is technically advantageous because it provides a method, system, and software through which the characteristics of a disk drive are determined and stored on the disk. This allows a processor to determine the characteristics of the disk drive by reading the characteristics stored on the drive, without reference to external specifications or user input.

Another technical advantage of the method, system, and software disclosed herein is that the disclosed method, system, and software allows a set of drives to be created such that the set of disk drives have similar characteristics. In this way, the performance of the set of disk drives is not degraded by one or more drives with inferior characteristics in the set. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (110) devices, such as a keyboard, a mouse, and a video display. Memory and disk drives are tangible media. The information handling system may also include one or more buses operable to transmit communications between the various hardware components.

Figure 1:
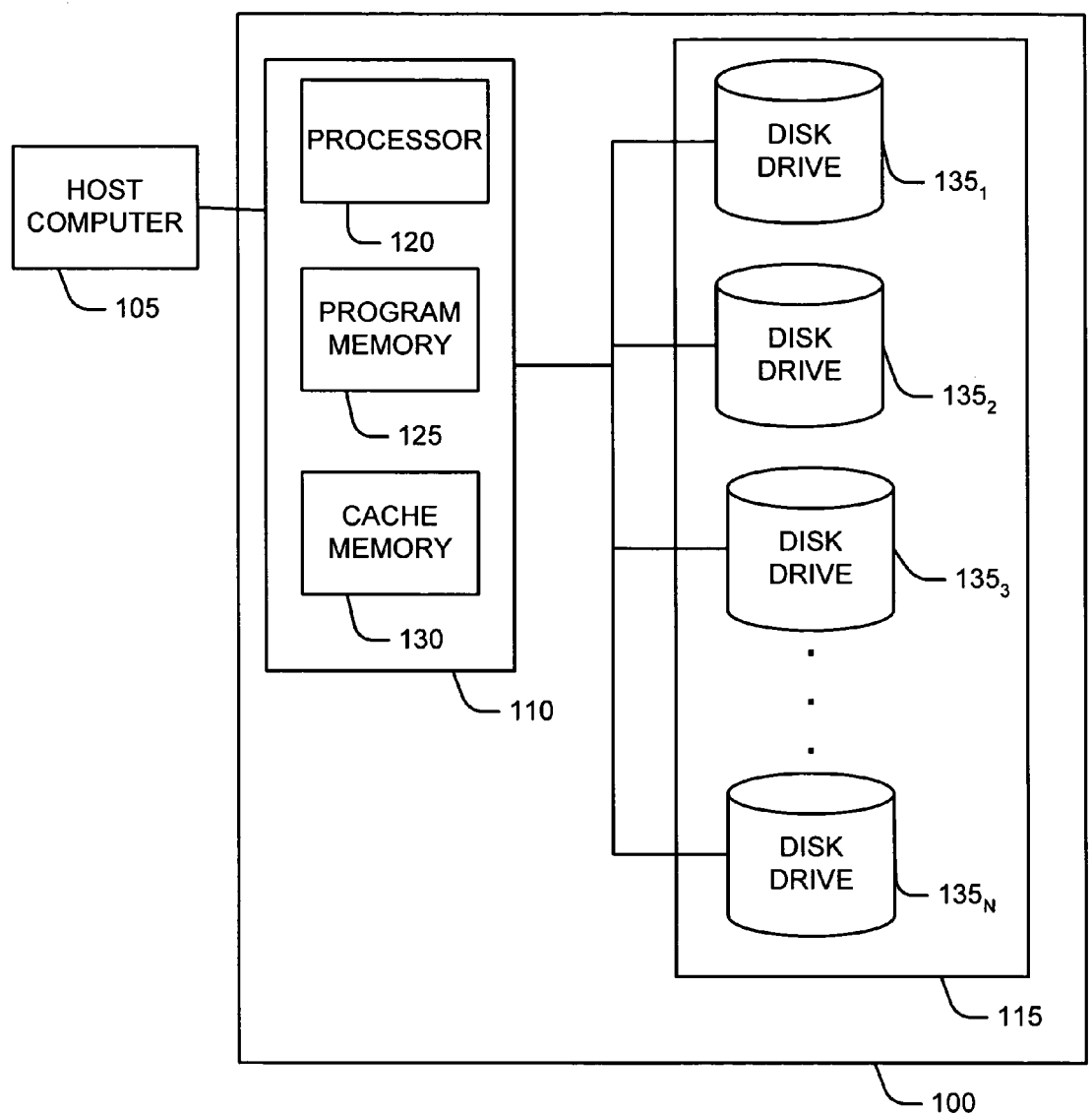
FIG. 1 is a diagram of an information handling system.

Shown in FIG. 1 is an information handling system that includes a RAID subsystem 100 connected to a host computer 105. The RAID subsystem, in turn, includes a RAID controller 110 that includes a processor 120, program memory 125, and cache memory 130. The RAID controller 110 is connected to a drive array 115, containing N disk drives $135_{1...N}$. In general, the drive array 115 may be homogenous or varied. In certain example implementations the drive array 115 includes drives with Small Computer System Interface (SCSI) interfaces, Serial Attached SCSI (SAS) interfaces, and Serial Advanced Technology Attachment (SATA) interfaces, and drives with other interfaces. Furthermore, the drive array 115 may contain drives with different capacities, seek times, and transfer rates. Finally, the drive array 115 may contain magnetic hard drives, flash memory based hard drives, solid state memory hard drives or hard drives based on other technologies, or some combination of these hard drives. The RAID controller 115 is configured to create one or more RAID sets from one or more of disk drives $135_{1...N}$. In some example implementations, the RAID sets are RAID Levels 0, 1, 0+1, 5, or JBOD sets. The RAID controller includes software or firmware to read data from and write data to the one or more RAID sets.

Figure 2:
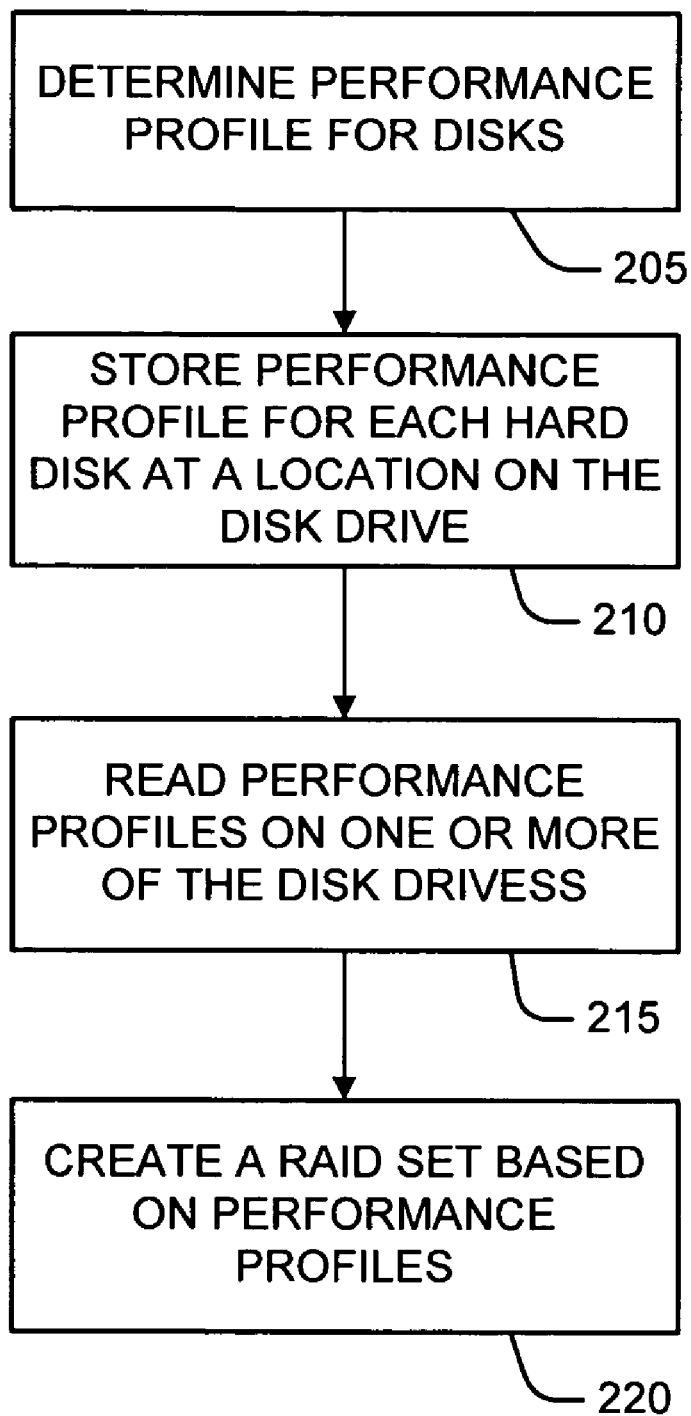
FIG. 2 is a flow diagram of a series of method steps for creating an optimized disk set.

Shown in FIG. 2 is a flow diagram of a method of creating a RAID set from one or more of the disk drives $135_{1...N}$. The method includes determining a performance profile for the disk drives $135_{1...N}$ (block 205). The performance profile for each of the disk drives $135_{1...N}$ is written to a location on that disk drive (block 210). In certain example implementations, the location where the profile is a reserved location on each of the disk drives $135_{1...N}$. The RAID controller 110 is aware of the location where the performance profiles are stored. The method then includes reading the performance profiles on one or more of the disk drives $135_{1...N}$ block 215). A RAID set is created based on the read performance profile (block 220).

Figure 3:
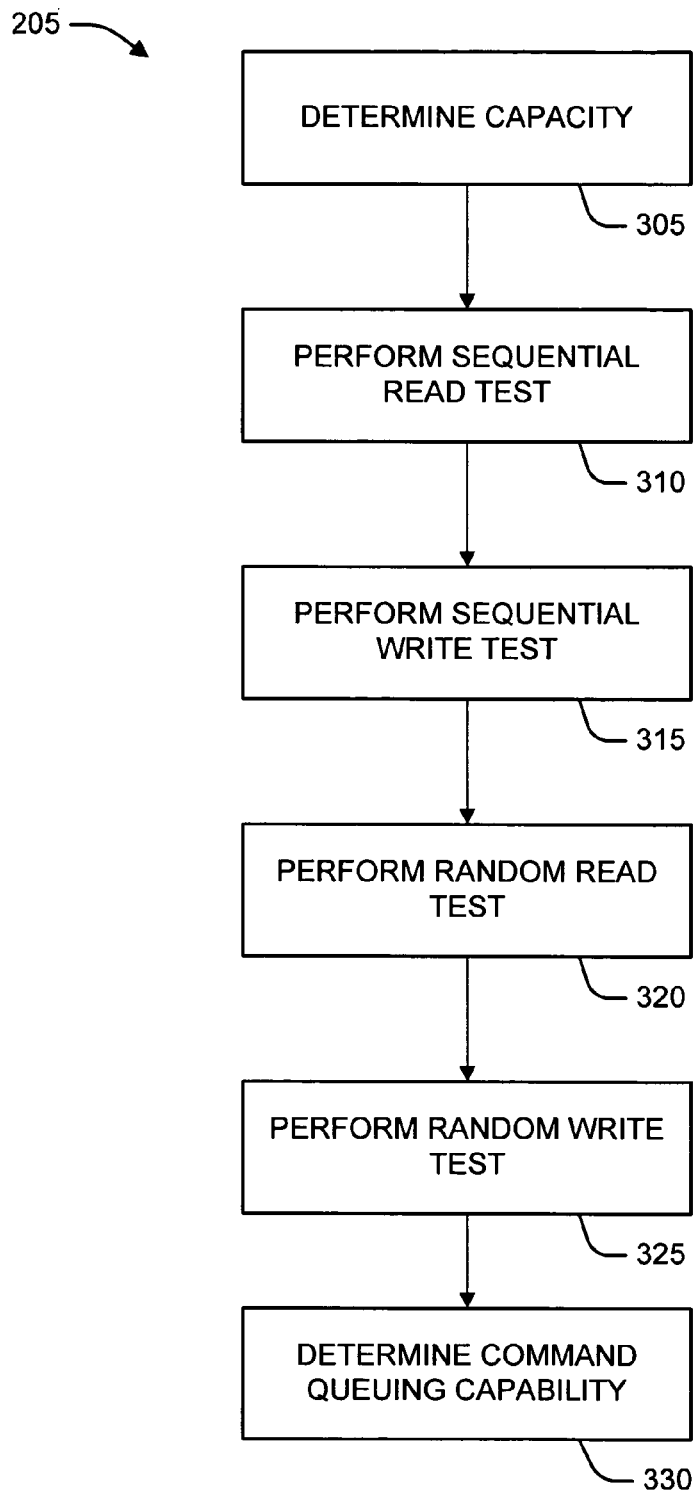
FIG. 3 is a flow diagram of a series of method steps for determining the characteristics of a disk drive.

Shown in FIG. 3 is a flow diagram of a method for determining the performance profile for one of the disk drives $135_{1...N}$ (block 205). The RAID controller 110 determines the capacity of the disk drive (block 305). The RAID controller 110 performs a sequential read test to determine a sequential read performance of the disk drive (block 310). The RAID controller 110 performs a sequential write test to determine a sequential write performance of the disk drive (block 315). The RAID controller 110 performs a random read test to determine a random read performance of the disk drive (block 320). The RAID controller 110 performs a random write test to determine a random write performance of the disk drive (block 325). The RAID controller 110 determines the command queuing capabilities of the disk drive (block 330). In certain example embodiments, tests that involve writing to the disk drive are performed before any user data is stored on the disk drives. In such example embodiments, these tests will not overwrite any user data. In other example embodiments where write tests are performed after user data is stored on the disk drive, the test writes can be performed on special reserved test locations or the test can read user data first and rewrite the data back out to the same location. In certain implementations, one or more of the steps are omitted. In other example implementations, the steps are performed in a different order. As discussed above, the disk drive characteristics are written to a location on the disk drive. In some example implementations, the performance profile of a disk drive is determined when the disk drive is added to the disk array 115.

Figure 4:
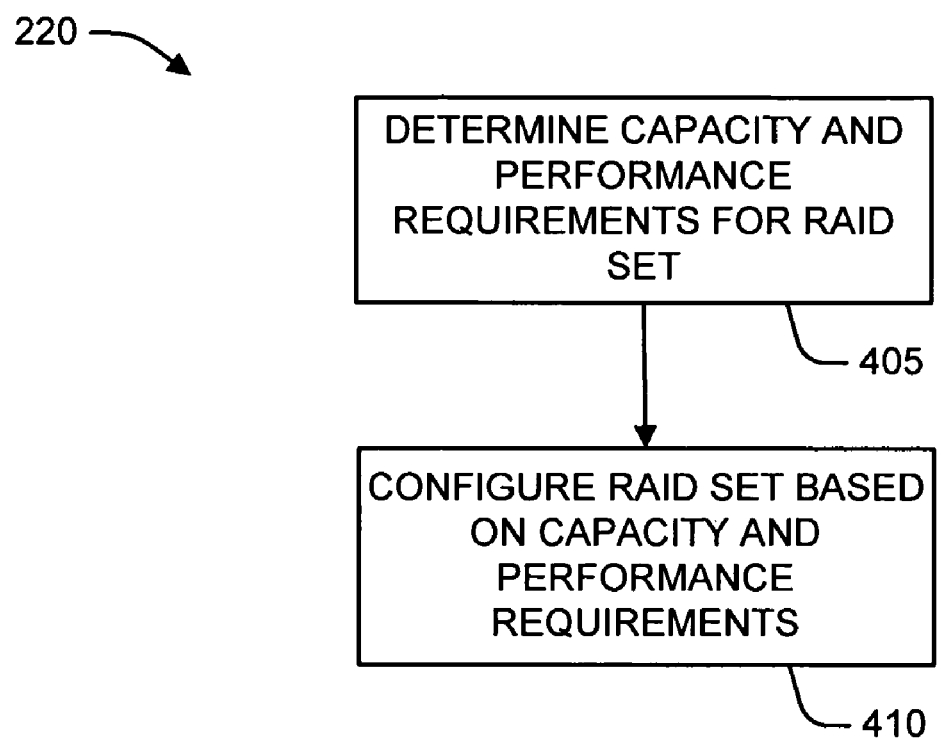
FIG. 4 is a flow diagram of a series of method steps for creating a RAID set based on performance profiles.

Shown in FIG. 4 is a flow diagram of a method of creating a RAID set based on the performance profiles of one or more of disk drives $135_{1...N}$ (block 220). The method includes determining capacity and performance requirements for the RAID set (block 405) and configuring the RAID set based on the capacity and performance requirements (block 410). In certain implementations, the determination of the capacity and performance requirements for the RAID set may be fully automatic. In other implementations, capacity the determination of the capacity and performance requirements for the RAID set may be based on a configuration file prepared by a user of host computer 105.

In still other implementations, the determination of the capacity and performance requirements for the RAID set may be determined by input from a user of host computer 105. The system may provide the user of the host computer 105 with "hints." These hints may be based on determining the desired use of RAID set. For example, if the desired use of the RAID set is for a database that will be read often, but seldom written to, the system will emphasize random read performance as the disk drive characteristic to be maximized. In another example, if the desired use of the RAID set is for a database that will be updated or written to frequently, then the system will emphasize random write performance as the disk drive characteristic to be maximized. In another example, if the desired use of the RAID set is for the storage video files, then the system will emphasize sequential read or write performance as the disk drive characteristic to be maximized.

In another implementation, the system considers input from tests run on one or more applications when determining how to configure the RAID set. For example, the system may profile the activity of a database system to determine the relative read and write loads to determine, in turn, whether to emphasize read or write performance when selecting disk drives for the RAID set.

Figure 5A:
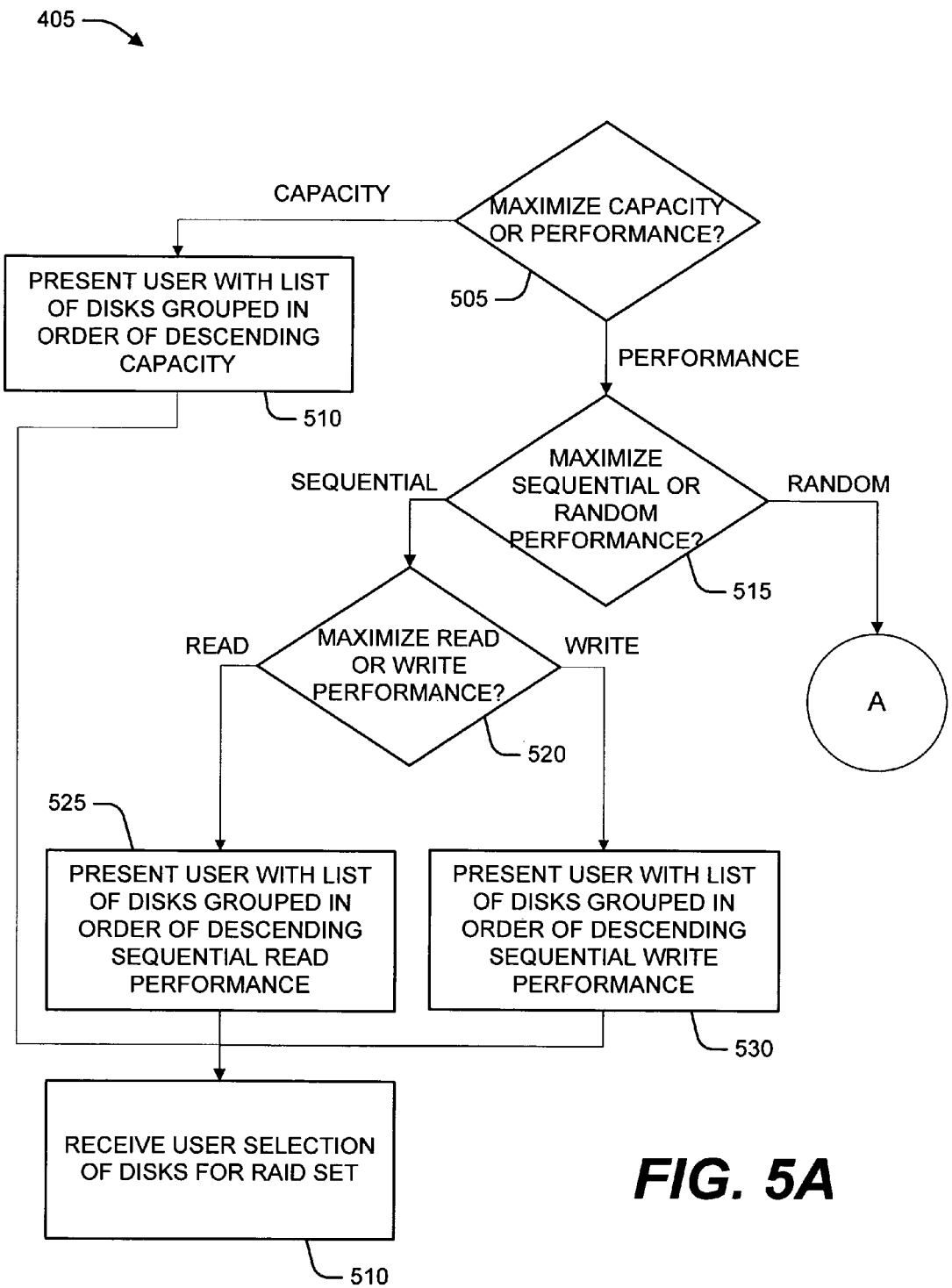
FIGS. 5A and 5B are flow diagrams of a series of method steps for determining capacity and performance requirement for the RAID set.
Figure 5B:
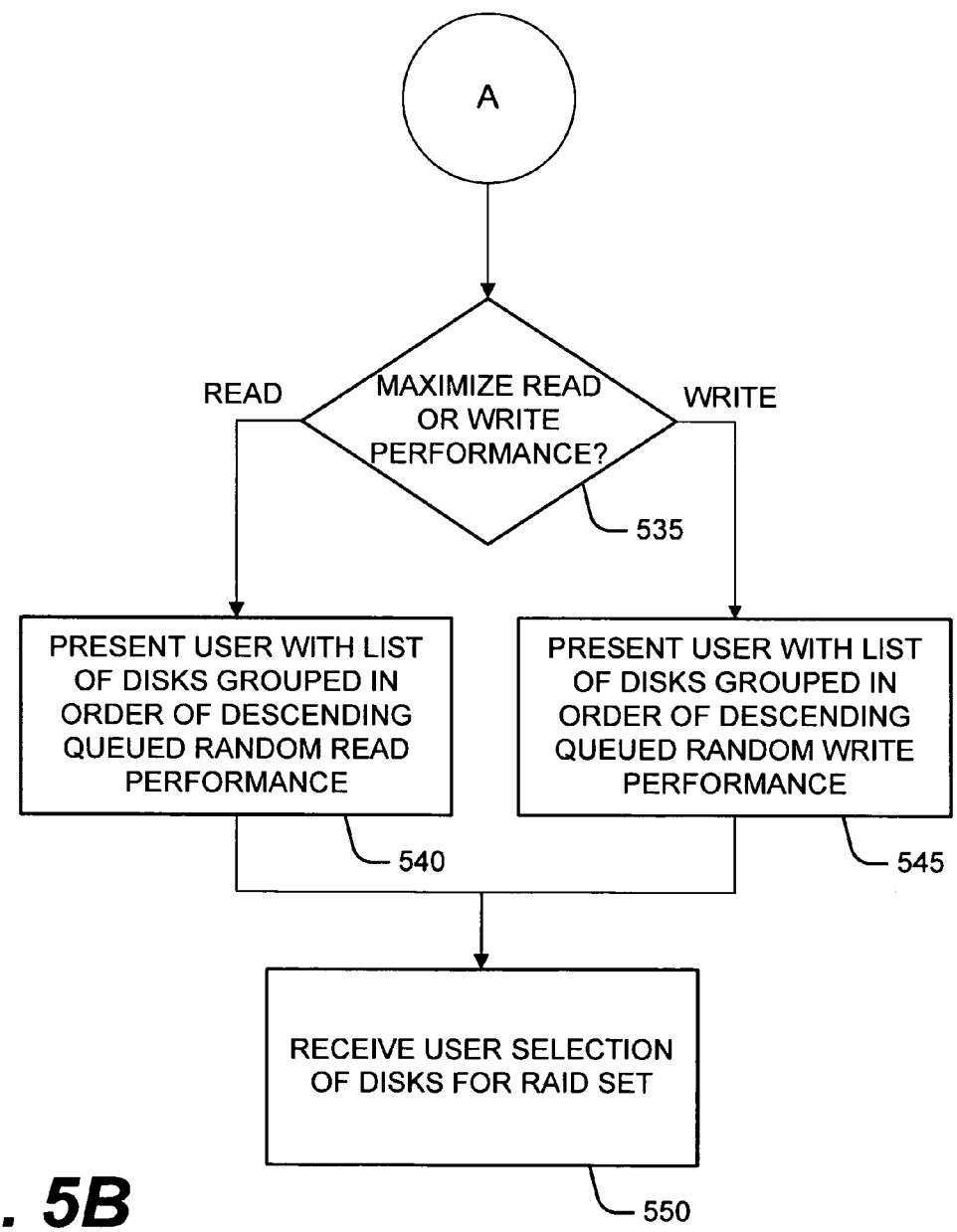

Shown in FIGS. 5A and 5B is a flow diagram of a method of determining capacity and performance requirements for the RAID set (block 405). The method includes determining whether to maximize capacity or performance (block 505). If the system determines that capacity should be maximized, then the user is presented with a list of available disk drives grouped in order of descending capacity (block 510). The system then receives the user's selection of disks for the RAID set (block 510). In other implementations, the user may reorder the list of disk drives based one or more other characteristics.

If, however, the system determines that performance should be maximized (block 505), then the system determines if sequential or random performance should be maximized (block 515). If the system determines that sequential performance should be maximized (block 515), then the system determines whether read or write performance should be maximized (block 520). If sequential read performance should be maximized then the user is presented with a list of disk drives grouped in order of descending sequential read performance (block 525), and the system receives the user selection of disk drives for the RAID set (block 510). If sequential write performance should be maximized, then the user is presented with a list of disk drives grouped in order of descending sequential write performance (block 530), and the system receives the user selection of disk drives for the RAID set (block 510).

If the system determines that random performance should be maximized (block 515), then the system determines whether read or write performance should be maximized (block 535 in FIG. 5B). If random read performance should be maximized then the user is presented with a list of disk drives grouped in order of descending random read performance (block 540), and the system receives the user selection of disk drives for the RAID set (block 510). If random write performance should be maximized, then the user is presented with a list of disk drives grouped in order of descending random write performance (block 545), and the system receives the user selection of disk drives for the RAID set (block 510).

The RAID set creation methodology disclosed herein promotes the creation of RAID sets with characteristics adapted to specific uses. Through the use of the drive profiling procedure described above, the characteristics of disk drives may be determined without reference to external specifications or user input. Once the disk drives are profiled, RAID sets can be created where each of the disks in the RAID set have similar characteristics. Although the present disclosure has been described in detail, it should be understood that various changes, substitutions, and alterations can be made hereto without departing from the spirit and the scope of the invention as defined by the appended claims.

What is claimed is:

1. A method of creating a RAID set, comprising:
   determining a performance profile for a plurality of hard disks;
   wherein the determining comprises performing one or more write tests to determine one or more write speeds of the plurality of hard disks and wherein the one or more write tests accommodate user data stored on one or more of the hard disks such that the user data is not corrupted;
   storing the performance profile associated with each of the hard disks at a location on each of the plurality of hard disks;
   reading the performance profiles on one or more of the hard disks;
   selecting a subset of the plurality of hard disks, based, at least in part on one or more of the read performance profiles; and
   creating a RAID set from the subset of the plurality of hard disks, wherein the hard disks selected for the RAID set have similar performance profiles.

2. The method of claim 1, where determining a performance profile for a plurality of hard disks further comprises:
   performing one or more read tests to determine one or more read speeds of the plurality of hard disks, where the read tests comprise one or more of a sequential read test and a random read test.

3. The method of claim 1,
   wherein the one or more write tests comprise one or more of a sequential write test and a random write test.

4. The method of claim 1, where determining a performance profile for a plurality of hard disks further comprises:
   determining the capacity of the plurality of hard disks.

5. The method of claim 1, where determining a performance profile for a plurality of hard disks further comprises:
   determining the command queuing capabilities of the plurality of hard disks.

6. The method of claim 1, where creating a RAID set comprises:
   determining capacity requirements of the RAID set; and
   determining performance requirements of the RAID set.

7. The method of claim 6, where determining the performance requirements of the RAID set comprises:
   determining sequential performance requirements of the RAID set; and
   determining the random performance requirements of the RAID set.

8. An information handling system, comprising:
   at least one processor;
   a plurality of hard disks;
   a memory comprising instructions that cause the at least one processor to:
      determine a performance profile for the plurality of hard disks;
      wherein the determining comprises performing one or more write tests to determine one or more write speeds of the plurality of hard disks and wherein the one or more write tests accommodate user data stored on one or more of the hard disks such that the user data is not corrupted;
      store the performance profile associated with each of the hard disks at a location on each of the plurality of hard disks;
      read the performance profiles on one or more of the hard disks; and
      select a subset of the plurality of hard disks, based, at least in part, on one or more of the read performance profiles; and
      create a RAID set from the subset of the plurality of hard disks, wherein the hard disks selected for the RAID set have similar performance profiles.

9. The information handling system of claim 8, where the instructions that cause the at least one processor to determine a performance profile for a plurality of hard disks further cause the at least one processor to:
   perform one or more read tests to determine one or more read speeds of the plurality of hard disks, where the read tests comprise one or more of a sequential read test and a random read test.

10. The information handling system of claim 8, where the instructions that cause the at least one processor to determine a performance profile for a plurality of hard disks further cause the at least one processor to:
    perform the one or more write tests, where the one or more write tests comprise one or more of a sequential write test and a random write test.

11. The information handling system of claim 8, where the instructions that cause the at least one processor to determine a performance profile for a plurality of hard disks further cause the at least one processor to:
    determine the capacity of the plurality of hard disks.

12. The information handling system of claim 8, where the instructions that cause the at least one processor to determine a performance profile for a plurality of hard disks further cause the at least one processor to:
    determine the command queuing capabilities of the plurality of hard disks.

13. The information handling system of claim 8, where the instructions that cause the processor to create a RAID set further cause the processor to:
    determine capacity requirements of the RAID set; and
    determine performance requirements of the RAID set.

14. The information handling system of claim 13, where the instructions that cause the processor to determine the performance requirements of the RAID set further cause the at least one processor to:
    determine sequential performance requirements of the RAID set; and
    determine the random performance requirements of the RAID set.

15. A computer program, stored in a tangible medium, comprising instructions that cause at least one processor to:
    determine a performance profile for a plurality of hard disks;
    wherein the determining comprises performing one or more write tests to determine one or more write speeds of the plurality of hard disks and wherein the one or more write tests accommodate user data stored on one or more of the hard disks such that the user data is not corrupted;

store the performance profile associated with each of the hard disks at a location on each of the plurality of hard disks;
read the performance profiles on one or more of the hard disks;
select a subset of the plurality of hard disks, based, at least in part, on one or more of the read performance profiles; and
create a RAID set from the subset of the plurality of the hard disks, wherein the hard disks selected for the RAID set have similar performance profiles.

16. The computer program of claim 15, where the instructions that cause the at least one processor to determine a performance profile for a plurality of hard disks further cause the at least one processor to:
perform one or more read tests to determine one or more read speeds of the plurality of hard disks, where the read tests comprise one or more of a sequential read test and a random read test.

17. The computer program of claim 15, where the instructions that cause the at least one processor to determine a performance profile for a plurality of hard disks further cause the at least one processor to:
perform the one or more write tests, where the write tests comprise one or more of a sequential write test and a random write test.

18. The computer program of claim 15, where the instructions that cause the at least one processor to determine a performance profile for a plurality of hard disks further cause the at least one processor to:
determine the command queuing capabilities of the plurality of hard disks.

19. The computer program of claim 15, where the instructions that cause the processor to create a RAID set further cause the processor to:
determine capacity requirements of the RAID set; and
determine performance requirements of the RAID set.

20. The computer program of claim 19, where the instructions that cause the processor to determine the performance requirements of the RAID set further cause the at least one processor to:
determine sequential performance requirements of the RAID set; and
determine the random performance requirements of the RAID set.

* * * * *